US008553631B2

(12) United States Patent
Oprescu-Surcobe et al.

(10) Patent No.: US 8,553,631 B2
(45) Date of Patent: Oct. 8, 2013

(54) METHODS FOR REDUCING SET UP TIME FOR COMMUNICATIONS AMONG MULTIPLE USER EQUIPMENT IN A LONG TERM EVOLUTION SYSTEM

(75) Inventors: Valentin Oprescu-Surcobe, Northbrook, IL (US); Peter M. Drozt, Prairie Grove, IL (US); Michael F. Korus, Eden Prairie, MN (US); Donald G. Newberg, Hoffman Estates, IL (US); Aparna Pandey, Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 373 days.

(21) Appl. No.: 12/894,403

(22) Filed: Sep. 30, 2010

(65) Prior Publication Data

US 2012/0082098 A1    Apr. 5, 2012

(51) Int. Cl.
H04W 4/00 (2009.01)
H04W 72/00 (2009.01)
H04L 12/28 (2006.01)
H04B 7/00 (2006.01)
H04W 72/04 (2009.01)
H04W 76/02 (2009.01)

(52) U.S. Cl.
CPC ...... *H04W 72/0406* (2013.01); *H04W 72/0413* (2013.01); *H04W 72/0433* (2013.01); *H04W 76/02* (2013.01)
USPC ............ 370/329; 370/431; 455/450; 455/509

(58) Field of Classification Search
USPC ............... 370/328, 329, 431; 455/422.1, 450, 455/509, 518
See application file for complete search history.

(56) References Cited

U.S. PATENT DOCUMENTS

| 5,946,612 A | 8/1999 | Johansson |
| 6,038,449 A | 3/2000 | Corriveau et al. |
| 6,400,951 B1 | 6/2002 | Vaara |
| 7,260,074 B2 | 8/2007 | Vare |
| 7,929,970 B1 | 4/2011 | Gunasekara et al. |

(Continued)

FOREIGN PATENT DOCUMENTS

| CN | 101242573 A | 8/2008 |
| CN | 100438654 C | 11/2008 |

(Continued)

OTHER PUBLICATIONS

PCT International Search Report and Written Opinion for Application No. PCT/US2011/067710 dated Apr. 16, 2012.

(Continued)

*Primary Examiner* — Paul H Masur
(74) *Attorney, Agent, or Firm* — Steven A. May

(57) ABSTRACT

Methods for reducing set-up time for communications among multiple user equipment (UE) in a Long Term Evolution (LTE) communication system are described. In accordance with one method, an LTE subsystem that includes a eNodeB and a Mobility Management Entity (MME): receives a request for an LTE connection from a first UE associated with a virtual channel, and responsive to contents in the request for the LTE connection, generates on behalf of the first UE, a request to transmit media on the virtual channel, which the LTE system sends to an application server to trigger an establishment of a call to deliver a media transmission from the first UE to at least one other UE associated with the virtual channel.

18 Claims, 3 Drawing Sheets

(56) References Cited

U.S. PATENT DOCUMENTS

| | | | |
|---|---|---|---|
| 2003/0236827 A1 | 12/2003 | Patel et al. | |
| 2005/0111430 A1 | 5/2005 | Spear et al. | |
| 2005/0282571 A1 | 12/2005 | Oprescu-Surcobe et al. | |
| 2006/0025151 A1 | 2/2006 | Karaoguz et al. | |
| 2006/0252430 A1 | 11/2006 | Barreto et al. | |
| 2006/0252439 A1 | 11/2006 | Cai | |
| 2007/0207770 A1* | 9/2007 | Ikaheimo | 455/403 |
| 2008/0218209 A1 | 9/2008 | Lee | |
| 2009/0154408 A1* | 6/2009 | Jeong et al. | 370/329 |
| 2009/0213800 A1 | 8/2009 | Lee | |
| 2009/0318147 A1* | 12/2009 | Zhang et al. | 455/435.1 |
| 2010/0135206 A1* | 6/2010 | Cherian et al. | 370/328 |
| 2010/0190488 A1 | 7/2010 | Jung et al. | |
| 2010/0216454 A1 | 8/2010 | Ishida et al. | |
| 2010/0240375 A1 | 9/2010 | Ahluwalia | |
| 2010/0322069 A1* | 12/2010 | Song et al. | 370/229 |
| 2011/0117916 A1 | 5/2011 | Dahlen | |
| 2011/0188446 A1* | 8/2011 | Bienas et al. | 370/328 |
| 2011/0263255 A1 | 10/2011 | Alonso-Rubio et al. | |
| 2011/0305184 A1 | 12/2011 | Hsu | |
| 2012/0082105 A1 | 4/2012 | Hwang et al. | |
| 2012/0196543 A1 | 8/2012 | Andersson et al. | |

FOREIGN PATENT DOCUMENTS

| | | |
|---|---|---|
| CN | 100466812 C | 3/2009 |
| EP | 1959617 A1 | 8/2008 |
| WO | 2005006829 A2 | 1/2005 |
| WO | 2008137354 A1 | 11/2008 |
| WO | 2009053933 A1 | 4/2009 |
| WO | 2009096833 A1 | 8/2009 |
| WO | 2010054391 A1 | 5/2010 |
| WO | 2011157216 A1 | 12/2011 |

OTHER PUBLICATIONS

Nokia et al: "Enabling techniques for MBMS service continuity", 3GPP TSG-RAN WG 2 Meeting #58bis; R2-072415—Jun. 2007.

Motorola: MBMS Session Start and UE mobility between MBSFN and PTM, 3GPP TSG-RAN EG2#60; R2-074648—Nov. 2007.

Mediatek: "MBMS reception status report for service continuity",3GPP TSG-RAN2 #75 Meeting; R2-114197—Aug. 2011.

Mediatek: "MBMS SC in connected mode", 3GPP TSG-RAN2 #75 Meeting; R2-115220—Oct. 2011.

International Search Report in PCT Application No. PCT/US2011/067707 mailed May 7, 2012.

PCT International Search Report and Written Opinion for Application No. PCT/US2012/067692 dated Jun. 29, 2012.

PCT International Search Report Dated Dec. 16, 2011.

"3RD Generation Partnership Project:Technical Specification Group Services and System Aspects: 3GPP Enablers for Open Mobile Alliance (OMA); Push-to-Talk Over Cellular (POC) Services; Stage 2, Release 9", Mobile Conference Centre, France, Dec. 11, 2009, pp. 1-38; XP050400718.

"Universal Mobile Telecommunications System (UMTS): LTE; Multimedia Broadcast/Multicast Service (MBMS); Architecture and Functional Description (EGPP TS 23.246 Version 9.5.0 Release 9)", Technical Specification European Telecommunications Standards Institute (ETSI), France, Jun. 1, 2010; vol. 3GPP SA 2, No. V9.5.0; XP014047180.

Non-Final Office Action mailed Mar. 14, 2013 in U.S. Appl. No. 12/982,208, Valentin OprescuSurcobe, filed Dec. 30, 2010.

International Preliminary Report on Patentability and Written Opinion for International Patent Application No. PCT/US2011/067710 issued Jul. 2, 2013.

Notice of Allowance mailed Feb. 6, 2012 in U.S. Appl. No. 12/981,923, Valentin OprescuSurcobe, filed Dec. 30, 2010.

Non-Final Office Action mailed Feb. 14, 2013 in U.S. Appl. No. 12/981,985, Valentin Oprescu-Surcobe, filed Dec. 30, 2010.

International Preliminary Report on Patentability and Written Opinion for International Patent Application No. PCT/US2011/067707 issued Jul. 2, 2013.

International Preliminary Report on Patentability and Written Opinion for International Patent application No. PCT/US2011/050483 issued Apr. 2, 2013.

* cited by examiner

METHODS FOR REDUCING SET UP TIME FOR COMMUNICATIONS AMONG MULTIPLE USER EQUIPMENT IN A LONG TERM EVOLUTION SYSTEM

TECHNICAL FIELD

The technical field relates generally to communication systems and more particularly to reducing set-up time for communications among multiple user equipment in a Long Term Evolution communication system.

BACKGROUND

Long Term Evolution (LTE) is the last step toward the $4^{th}$ generation (4G) of radio technologies designed to increase the capacity and speed of mobile telephone networks and provides for an end-to-end Internet Protocol (IP) service delivery of media. Currently, LTE comprises a set of enhancements to the Universal Mobile Telecommunications System (UMTS), which is described in a suite of Technical Specifications (TS) developed within and publicized by 3rd Generation Partnership Project (3GPP), with the most recent version of the 3GPP TSs being published in June 2010 as a revised "Release 9" (with Release 10 currently being developed).

LTE, in part, provides for a flat IP-based network architecture designed to ensure support for, and mobility between, some legacy or non-3GPP systems such as, for instance, GPRS (general packet radio service) and WiMAX (Worldwide Interoperability for Microwave Access). Some of the main advantages with LTE are high throughput, low latency, plug and play, FDD (frequency-division duplexing) and TDD (time-division duplexing) in the same platform, improved end user experience, simple architecture resulting in low operating costs, and interoperability with older standard wireless technologies such as GSM (Global Systems for Mobile Communications), CdmaOne™, W-CDMA (UMTS), and CDMA2000®.

Many major carriers in the United States (US) and several worldwide carriers have started to convert their networks to LTE. In addition, public safety agencies in the US (including US Intelligence Services) have endorsed LTE as the preferred technology for the new 700 MHz public safety radio band. However, LTE systems do not currently provide some of the benefits of legacy systems for public safety applications.

For example, some public safety applications (for instance mission critical applications using push-to-talk), experience fast set-up times for communications among multiple user equipment using the legacy communication systems, which are not currently realizable on LTE systems. Since such applications are widely deployed, public safety customers will continue to expect these faster call set-up times even on the LTE systems.

Thus, there exists a need for methods of reducing set-up time for communications among multiple user equipment in an LTE communication system.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
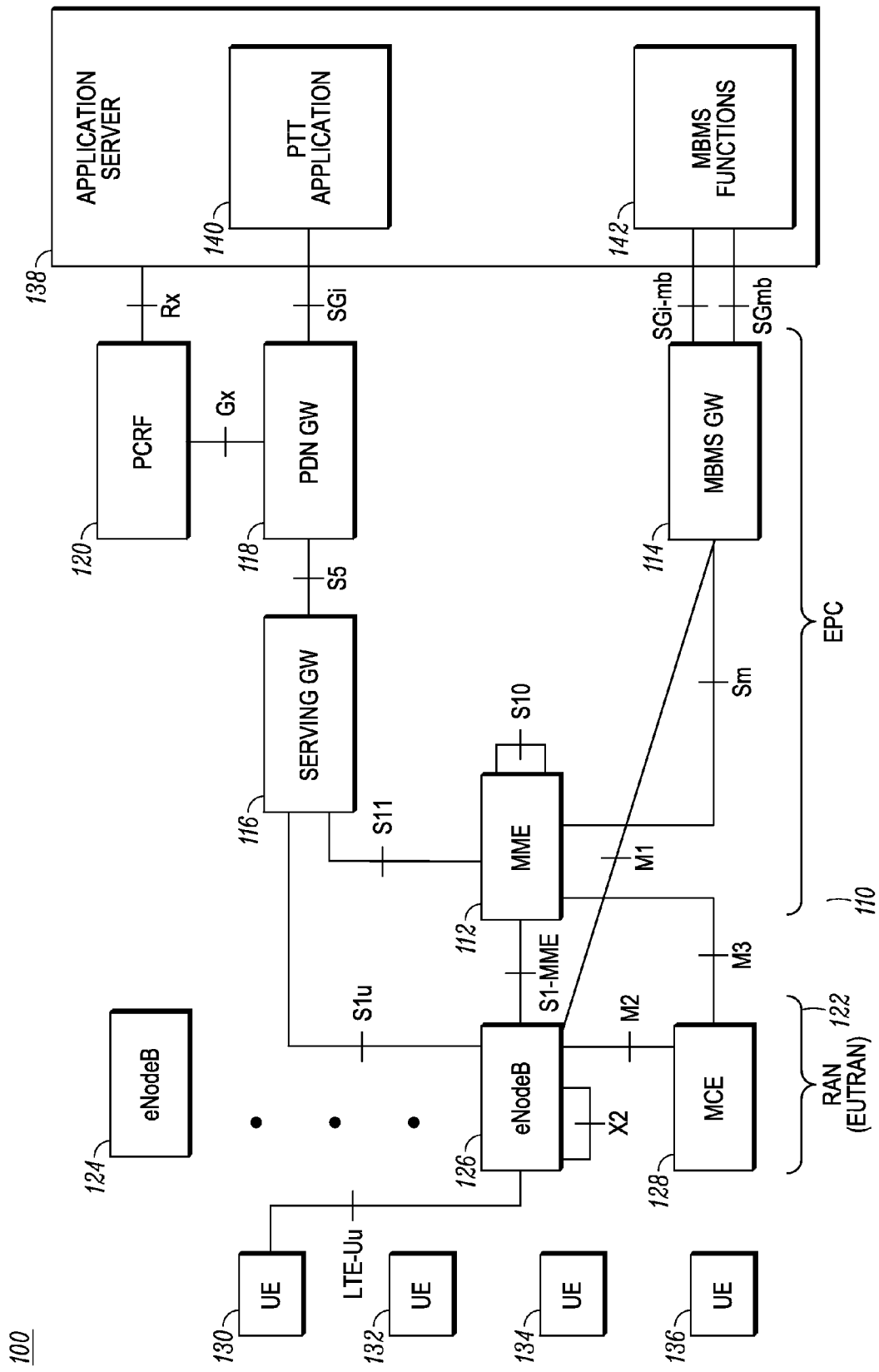
FIG. 1 is a system diagram of a communication system that implements methods for reducing set-up time for communications among multiple user equipment in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to an embodiment, an LTE subsystem: receives a request for an LTE connection from a first user equipment (UE) associated with a virtual channel; responsive to contents in the request for the LTE connection, and while the connection is being established and a bearer for media transmission is bring activated, the LTE subsystem generates on behalf of the first UE, a request to transmit media on the virtual channel and sends the request to transmit to an application server to trigger an establishment of a call to deliver a media transmission from the first UE to at least one other UE associated with the virtual channel. In an illustrative implementation, the LTE subsystem further notifies the application server when a dedicated Evolved Packet System bearer for the media transmission has been activated for the first UE.

In accordance with another embodiment, an application server: receives a request to transmit media on a virtual channel, wherein the request to transmit is generated by an LTE subsystem on behalf of a first UE associated with the virtual channel; and responsive to receiving the request to transmit, sends, to at least one other UE associated with the virtual channel, a notification of upcoming media transmission on the virtual channel. In an illustrative implementation, the application server further receives a bearer activated message when a dedicated Evolved Packet System bearer has been activated for the first UE for the media transmission, and in response to the bearer activated message, signals the first UE that the request to transmit is granted and signals the at least one other UE that a request to transmit was granted for the media transmission.

In accordance with yet another embodiment: a user equipment: generates a request for an LTE connection, wherein the request includes an identifier for the UE and an identifier for a virtual channel with which the UE is associated; and sends the request to an LTE subsystem to trigger the LTE subsystem to generate, and send to an application server on behalf of the UE, a request to transmit media on the virtual channel. In an illustrative implementation, the identifier for the UE and the identifier for the virtual channel are included in an S-TMSI field.

Using the various teachings herein, set-up times for communications among user equipment in an LTE system can be improved. Those skilled in the art will realize that the above recognized advantages and other advantages described herein are merely illustrative and are not meant to be a complete rendering of all of the advantages of the various embodiments.

Referring now to the drawings, and in particular FIG. 1, a communication system in accordance with some embodiments is shown and indicated generally at 100. System 100 includes system elements of: an LTE Evolved Packet Core (EPC) 110 having a number of logical elements (including a Mobility Management Entity (MME) 112, a Multimedia Broadcast Multicast Service Gateway (MBMS GW) 114, a Serving Gateway (SGW) 116, a Packet Data Network Gateway (PDN GW) 118, and a Policy and Charging Rules Function (PCRF) 120); an access network (in this case a radio access network (RAN)) 122 that includes a plurality of eNodeB (LTE base station) infrastructure devices 124 and 126 and a Multicast Control Entity (MCE) 128; a plurality of UE 130, 132, 134, and 136; and an application server (AS) 138 having logical entities of a Push-to-Talk application 140 and MBMS functions 142. In general, the EPC and the RAN are referred to collectively as the LTE system. The elements of communication system 100 and the interfaces between them are further described below.

In addition, the RAN 122 elements, EPC 110 elements, application server 138, and UE 130 to 136 implement protocols and signaling in accordance with 3GPP TSs; and the terms LTE communication system, LTE system, and Evolved Packet System (EPS) are used interchangeably herein and are each defined as being inclusive of the RAN 122 and the EPC 110 but not inclusive of the application server 138 or the UE. By contrast, the application server 138 is included in a network of a service provider for the UE, and communications between the application server 138 and the UE are facilitated using the LTE system. Moreover, only a limited number of EPC elements and UE, and one application server and RAN are shown in the diagram, but more such elements may be included in an actual commercial or private system implementation; and only one UE is shown connected to an eNodeB, and one eNodeB is shown connected to the EPC for ease of illustration. Also, the RAN can be any type of access network, including any 2G, e.g., Global System for Mobile Communication (GSM) or 3G, e.g., Universal Mobile Telecommunications System (UMTS), access network.

In general, the UE, the application server 138, the EPC 110 logical elements, and the RAN 122 elements are each implemented using (although not shown) a memory, one or more network interfaces, and a processing device that are operatively coupled, and which when programmed form the means for these system elements to implement their desired functionality, for example as illustrated by reference to the methods and additional diagrams shown in FIG. 2 to FIG. 4. The network interfaces are used for passing signaling, also referred to herein as messaging, (e.g., messages, packets, datagrams, frames, superframes, and the like) between the elements of the system 100. The implementation of the network interface in any particular element depends on the particular type of network, i.e., wired and/or wireless, to which the element is connected.

Where the network supports wireless communications, the interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware.

The processing device utilized by the UE, the application server 138, the EPC 110 logical elements, and the RAN 122 elements may be programmed with software or firmware logic or code for performing functionality described by reference to FIG. 2 to FIG. 4; and/or the processing device may be implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

We now turn to a brief description of the functionality of the system elements shown in FIG. 1, which will aid in the understanding of the later description of the methods illustrated in FIGS. 2 to 4. The UE 130, 132, 134, and 136, which are also referred to in the art as subscribers, communication devices, access devices, access terminals, mobile stations, mobile subscriber units, mobile devices, user devices, and the like, can be any type of communication device such as radios, mobile phones, mobile data terminals, Personal Digital Assistants (PDAs), laptops, two-way radios, cell phones, and any other device capable of operating in a wired or wireless environment and that can be used by public users (such as consumers) or private users (such as public safety users).

When a UE attaches to the LTE system, via the RAN, it is connected to the appropriate core network (i.e., MME, SGW, and PDN GW) based on an identity of a service provider sent by the UE. Mobility management for UE is classified based on the radio technologies of source and candidate (or target) LTE cells (with each cell defined as being inclusive of a single eNodeB's coverage area or a portion of an eNodeB's coverage area and can be identified by a cell identifier), and the mobility-state of the UE. Pursuant to this understanding of the relationship between cells and eNodeBs, within this text the terms "cell" and "eNodeB" may be used on occasion interchangeably, without loss of clarity. In addition, the abbreviation eNB may be used in lieu of eNodeB. From a mobility perspective, the UE can be in one of three states, DETACHED, IDLE, and ACTIVE. The DETACHED state is defined as a transitory state in which the UE is powered-on but is in the process of searching for and registering with the LTE system.

The ACTIVE state is defined as a state in which the UE is registered with the LTE system and has an RRC (radio resource control) connection with an eNodeB. Thus, a UE is deemed to have an "LTE connection" when the UE is in an ACTIVE state and has an RRC connection with an eNodeB, and when the UE to MME signaling connection has been established. In this ACTIVE state, the LTE system knows the cell to which the UE belongs and can transmit/receive data from the UE over bearer resources dedicated to the UE. Also, in the ACTIVE state, when a UE moves between two LTE cells, "backward" handover or predictive handover is carried out. In this type of handover, the source cell, based on radio frequency (RF) measurement reports from the UE, determines the target cell and queries the target cell if it has enough bearer resources to accommodate the UE. The target cell also prepares bearer resources before the source cell commands the UE to handover to the target cell. In an LTE system, it is the responsibility of the current (or serving) eNodeB to instruct the UE to send RF measurement reports and based on these reports, to prepare a target eNodeB to accept the UE, and finally to hand the UE over to the target eNodeB.

The IDLE state is defined as a power-conservation state for the UE, where the UE is not transmitting or receiving packets on a dedicated or default bearer but can receive MBMS service. In the IDLE state, no context about the UE is stored in the eNodeB, and the location of the UE is only known at the MME and only at the granularity of a tracking area (TA) that may include multiple eNodeBs. The MME knows the TA in which the UE last registered, and paging is necessary to locate the UE to a cell.

The application server 138 is an infrastructure device that supports applications (executed in a processing device) or provision of services to UE over the LTE system. Such applications include, but are not limited to, PTT services, PTV (Push-to-Video) services, PTX (push-to-anything) services via unicast or multicast. The multicast can be delivered through an EPS by way of unicast service or MBMS Service. In an embodiment, the application server 138 is an infrastructure element of a Public Land Mobile Network (PLMN) of a public safety agency to which the UE have access. As such, the application server may be, for instance, a computer aided dispatch (CAD) server, a media server, a call controller, etc. As illustrated, the application server 138 includes the PTT application 140 and the MBMS functions 142. The PTT application 140 facilitates media delivery to the UE that have PTT capabilities. The MBMS functions 142, which are typically associated with a Broadcast-Multicast Service Center (BM-SC), manage MBMS services to the UE and are the source of MBMS traffic. The MBMS functions 142 include, for example, authorization for terminals requesting to activate a MBMS service, scheduling of broadcast and multicast services, integrity and confidentiality protection of MBMS data, MBMS session announcement, and serving as an entry point for content providers or any other broadcast/multicast source that is external to the LTE system. Moreover, although MBMS point-to-multipoint (PTM) functions 142 are illustratively shown, the application server 138 can, alternatively, be configured with any suitable PTM (e.g., broadcast and/or multicast) capabilities.

The EPC 110 is an all-IP core network that provides mobile core functionality that, in previous mobile generations (2G, 3G), has been realized through two separate sub-domains: circuit-switched (CS) for voice and packet-switched (PS) for data. The EPC 110 enables the above-mentioned all IP end-to-end delivery of media: from mobile handsets and other user equipment with embedded IP capabilities, over IP-based eNodeBs, across the EPC and throughout the application domain, IMS (IP Multimedia Subsystem) and non-IMS.

As mentioned above, The EPC 110 comprises the logical components of the MME 112, the MBMS GW 114, the SGW 116, the PDN GW 118, and the PCRF 120 and further comprises the, respective, interfaces (also referred to in the art as reference points) between these logical entities. The logical entities of the EPC 110 are shown as separate logical blocks and indeed can, in some embodiments, each be included in separate hardware devices or can, alternatively, be combined in one or more hardware devices. Also, the EPC 110, depending on the size of the network, may have several such components serving thousands or tens of thousands of UE and serving many application servers. Additional known elements and interfaces in an EPC as described in the 3GPP TSs for LTE that are needed for a commercial or private embodiment of the EPC 110 are not shown in FIG. 1 for the sake of clarity.

Turning first to the MME 112, this EPC element is the key control-node for UE access on the LTE system. It is responsible for IDLE mode UE tracking and paging procedures, including retransmissions. It is involved in the bearer activation/deactivation process and is also responsible for choosing the SGW for a UE at the initial attach and at time of intra-LTE handover involving Core Network (CN), i.e., MME, SGW, PDN GW, node relocation. The MME 112 is responsible for authenticating the user (by interacting with an HSS, not shown). Non-Access Stratum (NAS) signaling generated using a NAS protocol terminates at the MME 112, and the MME 112 is also responsible for generation and allocation of temporary identities or identifiers to UE. The MME 112 further checks the authorization of the UE to camp on the service provider's PLMN and enforces UE roaming restrictions.

In the control-plane, the NAS protocol, which runs between the MME 112 and the UE, is used for control-purposes such as network attach, authentication, setting up of bearers, and mobility management. Unlike in other systems, in LTE the allocation and maintenance of bearers is independent of the connection state of the UE, in the sense that a UE may be connected and not have bearers allocated to it and conversely, a UE may be idle but have allocated bearers.

As used herein, the term bearer or bearer resource is defined as a transmission path in a network (such as a RAN) and is used to carry UE data traffic (also termed, herein, as communications or service data flows (SDFs)). An EPS bearer is defined as a bearer that extends between the UE and the PDN GW and encompasses both a wireless path (UE to eNodeB), as well as a network transport path (eNodeB to PDN GW). A bearer can be bidirectional, i.e., having both an uplink path from the UE to the application server and a downlink path from the application server to the UE; or a bearer can be unidirectional, such as a common point-to-multipoint (PTM) downlink path from the application server to the UE for MBMS traffic.

A bearer can be point-to-point (PTP) (such as a dedicated bearer or a default bearer), or a PTM bearer (such as a MBMS bearer) and has associated therewith a set of characteristics or attributes including, but not limited to, QoS, a carrier frequency at which data is modulated, a particular bandwidth, bit rate, etc. A default bearer is defined as a non-GBR (guaranteed bit rate) bearer that provides for "best effort" SDF transmission and is allocated to a UE for the duration of its attachment to the LTE system and need not be explicitly requested. A dedicated bearer is defined as any additional bearer that is established for the same UE and is specifically requested by (or on behalf of) a UE and can be either non-GBR or GBR.

The MBMS GW 114 is an entry point in the LTE system, and it distributes MBMS traffic to all eNodeBs within MBMS service areas. MBMS may use Single Frequency Network (SFN) transmission, also referred to as MBSFN. In MBSFN, the transmission happens from a time-synchronized set of eNodeBs using the same resource blocks. IP multicast can be used for distributing the traffic from the MBMS GW 114 to the different eNodeBs. The MCE 128 in the RAN 122 ensures that the same resource blocks are allocated for a given service across all the eNodeBs of a given MBSFN area. It is the task of the MCE 128 to ensure that RLC/MAC layers at the eNodeBs are appropriately configured for MBSFN operation.

The SGW 116 routes and forwards user point-to-point data packets, while also acting as the mobility anchor for the user plane during inter-eNodeB handovers and as the anchor for mobility between LTE and other 3GPP technologies.

The PDN GW 118 provides connectivity to the UE to external packet data networks (PDNs) by being the point of exit and entry of traffic for the UE. A UE may have simultaneous connectivity with more than one PDN GW for accessing multiple PDNs. The PDN GW 118 performs policy enforcement, packet filtering for each user, charging support, lawful interception and packet screening. Another key role of the PDN GW 118 is to act as the anchor for mobility between 3 GPP and non-3GPP technologies such as WiMAX and 3GPP2 (CDMA 1X and EvDO). The PCRF 120 supports SDF detection, policy enforcement and flow-based charging.

RAN 122 in this embodiment is a E-UTRAN (Evolved UMTS Terrestrial Radio Access Network) comprising multiple cells each served by an eNodeB, e.g., 124, 126, which serve as the intermediate infrastructure device between the UE and the EPC 110 and a point of access for the UE to allocated bearers. Each cell represents a geographic coverage area that provides the wireless resources termed herein as bearers for carrying data (or SDFs) for UE connected to the RAN. An RRC layer in the eNodeB makes handover decisions based on neighbor cell measurements sent by the UE, pages for the UE over the air, broadcasts system information, controls UE RF measurement reporting such as the periodicity of Channel Quality Information (CQI) reports, and allocates cell-level temporary identifiers to active UE. The RRC layer also executes transfer of UE context from the source eNodeB to the target eNodeB during handover, and does integrity protection of RRC messages. In addition, the RRC layer is responsible for the setting up and maintenance of EPS bearer resources.

Regarding the LTE reference points, the UE communicates its signaling with an eNodeB via an LTE-Uu reference point. An S1-MME reference point is used for the control plane protocol (e.g., eRANAP which uses Stream Control Transmission Protocol (SCTP) as the transport protocol) between the E-UTRAN (e.g., via the eNodeB 126) and the MME 112. An S1*u* reference point between the eNodeB 126 (E-UTRAN) and the SGW 116 is used for the per-bearer user plane tunneling and inter-eNodeB path switching during handover, wherein the transport protocol over this interface is GPRS Tunneling Protocol-User plane (GTP-U). An X2 reference point is used for inter-eNodeB communications.

An S5 reference point provides user plane tunneling and tunnel management between the SGW 116 and the PDN GW 118 and is used for SGW relocation due to UE mobility and if the SGW needs to connect to a non-collocated PDN GW for the required PDN connectivity. Both GTP and IETF (Internet Engineering Task Force) based Mobile IP protocols are used over this interface.

A Gx reference point provides transfer of QoS policy and charging rules from the PCRF 120 to a Policy and Charging Enforcement Function (PCEF, not shown) in the PDN GW 118. An Rx reference point resides between the PCRF 120 and an Application Function (AF, not shown) in the application server 138. An S10 reference point resides between MMEs for MME relocation and MME to MME information transfer. An S11 reference point resides between the MME 112 and SGW 116 for corresponding signaling.

An SGi reference point resides between the PDN GW 118 and a packet data network (in this case a PDN that includes the application server 138), such as an operator-external public or private PDN or an intra-operator PDN, e.g., for provision of IMS services. The SGi reference point corresponds to a Gi reference point for 2G/3G accesses.

For supporting the PTM signaling provided by MBMS (in this illustrative embodiment), an SG-mb reference point between the MBMS GW 114 and the application server 138 supports MBMS bearer signaling for setting up and releasing context at MBMS session establishment and termination and also may support user related signaling, e.g. for Multicast session authorization, or user session joining or detach. An SGi-mb reference point between the MBMS GW 114 and the application server 138 supports the MBMS traffic plane. An M1 reference point between the MBMS GW 114 and the eNodeB 126 makes use of an IP multicast protocol for the delivery of packets to eNodeBs. The traffic plane "payload" is encapsulated in SYNC protocol data units (PDUs). An M2 reference point between the eNodeB 126 and the MCE 128 is used by the MCE 128 to provide the eNodeB with radio configuration data. An M3 reference point between the MME 112 and the MCE 128 supports the MBMS session control signaling, e.g. for session initiation and termination. An Sm reference point provides for communications between the MBMS GW 114 and the MME 112 to support the PTM services.

A PTM bearer is generally associated with a service and is identified via a Temporary Mobile Group Identity (TMGI). Between the eNodeB and the UE, the PTM bearer takes the form of a Multicast Traffic Channel (MTCH), with the traffic associated to a specific TMGI being carried by a specific MTCH at any given time. Within a MBSFN area, several MTCHs being transmitted with the same modulation and coding levels can be grouped in one MCH transport channel. Common signaling is carried out at both the RRC layer (e.g. the MCCH control channel) and at the MAC layer.

As used herein, the term virtual channel (VC) means an identifiable information flow between a media source and a set of target UE associated with the virtual channel. In general, it is possible to have several virtual channels active at the same time in a service area. A virtual channel can be seen as representative of a communication service and/or the group of users to which the information flow is addressed. To receive the desired content, the UE must identify and decode a downlink bearer to which the virtual channel is mapped. If one or more MBMS PTM bearers are used for a virtual channel, each bearer may include an MTCH and the associated legs through the SGi-mb and M1 interfaces. A UE may be a content source for a virtual channel by using an uplink bearer to send media to an application server.

Figure 2:
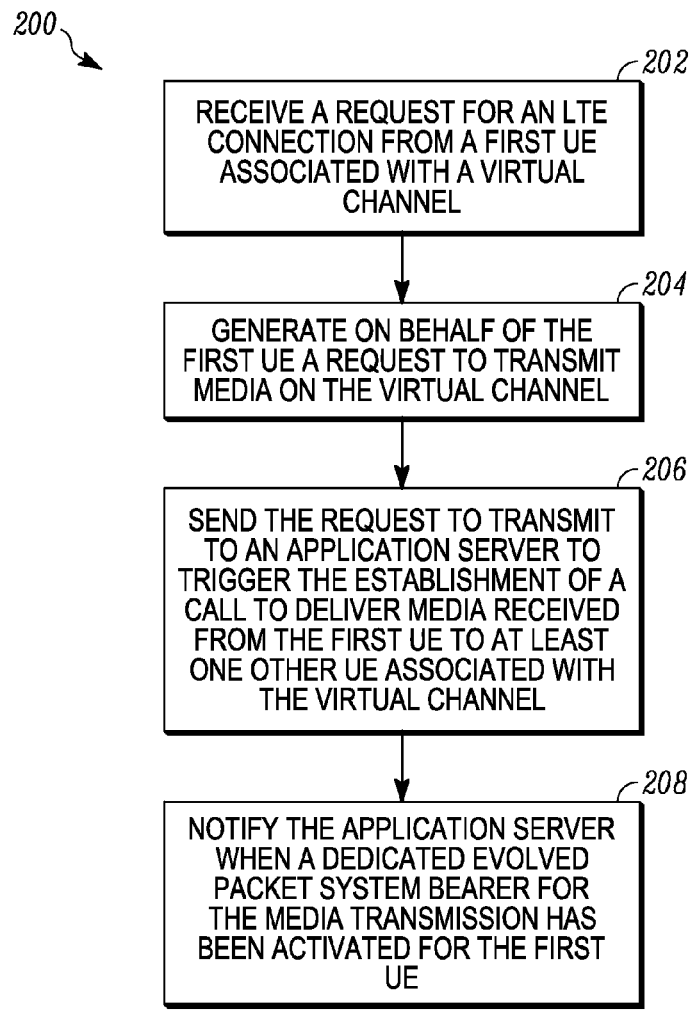
FIG. 2 is a flow diagram illustrating a method performed by an LTE subsystem for reducing set-up time for communications among multiple user equipment in accordance with some embodiments.
Figure 3:
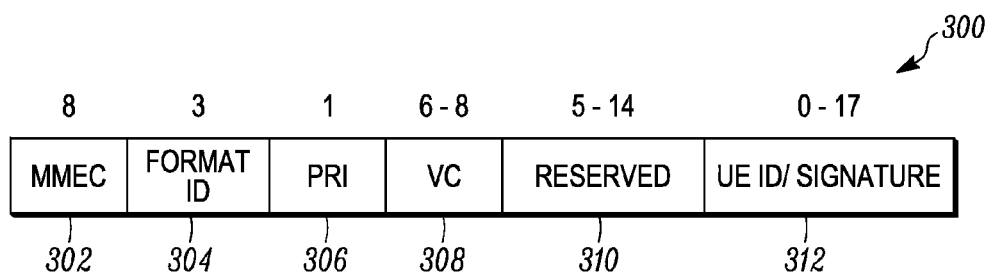
FIG. 3 is a block diagram illustrating an S-TMSI field having identifiers that facilitate implementing the methods for reducing set-up time for communications among multiple user equipment in accordance with some embodiments.

Turning now to FIG. 2, a flow diagram illustrating a method for reducing set-up time for communications among multiple user equipment is shown and generally indicated at 200. The functionality illustrated by method 200 is performed in an LTE subsystem, wherein a subsystem is defined as a subset (less than all) of the elements of the LTE system. In this illustrative embodiment, the LTE subsystem that performs method 200 includes an eNodeB or an MME depending on the particular implementation. For ease of understanding, FIG. 2 is described in conjunction with the diagram shown in FIG. 3 and the message sequence chart of FIG. 4.

In accordance with method 200, the eNodeB receives (202) a request for an LTE connection from a UE associated with a virtual channel that is mapped to a downlink bearer. FIG. 4 illustrates three UE 402, 404, 406 all associated with the same virtual channel, wherein associated with the virtual channel means that the UE has the necessary information to identify and decode the virtual channel in order to send or receive a media transmission over the virtual channel. A media transmission as used herein means messaging having media (e.g., voice, data, video, etc.) as its contents or payload. In some illustrative implementations, the UE can become associated with a virtual channel by choosing the virtual channel from an address book, a position of a channel selector knob/switch, a default setting, etc. In one example implementation, a table of Virtual channels-to-TMGIs is preloaded into the UEs (thus the UEs will associate to a virtual channel by referencing the mapping between the virtual channel and TMGIs); and this mapping can be tied to a selector knob/switch position on the UE for instance.

Figure 4:
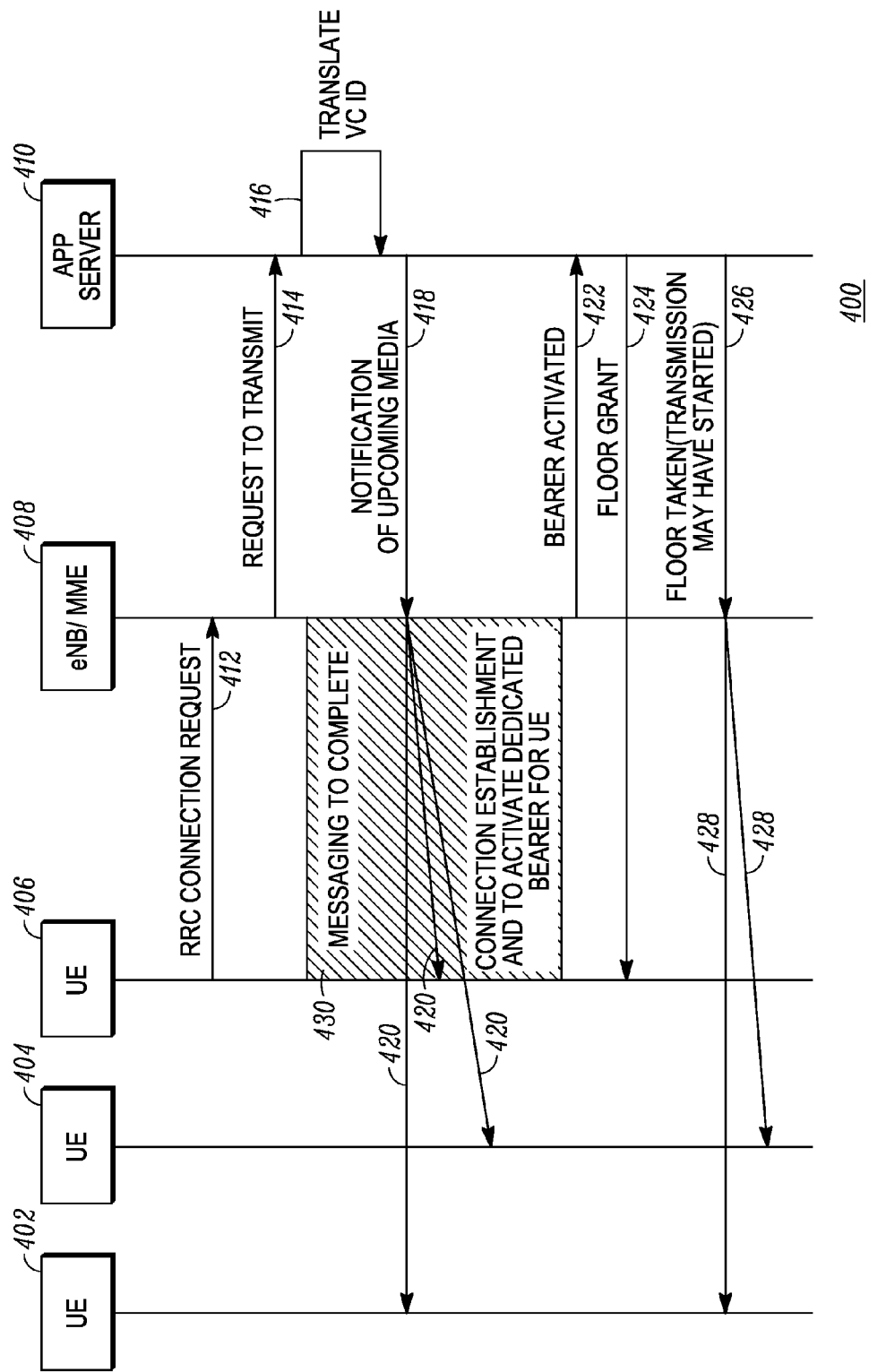
FIG. 4 is a message sequence chart illustrating signaling among multiple user equipment and LTE subsystem components for reducing set-up time for communications among the multiple user equipment in accordance with some embodiments.

FIG. 4 further shows an LTE subsystem 408 (which includes an eNB and an MME) and an application server 410. As can be seen in a message sequence chart (MSC) 400 illustrating signaling between these elements in accordance with an embodiment of the disclosure, the UE 406 constructs and sends to the eNodeB a request for an LTE connection. In this case, the request to connect is an RRCConnectionRequest message 412, which has a format that is compatible with the 3GPP TSs and is used to request connection to the LTE system when the UE is in an IDLE state. The request 412 includes an identifier for the UE and contents that identify the virtual channel with which the UE 406 is associated, e.g., a virtual channel identifier represented as a bit string. For instance, the TMGI, as described above, or a portion of the TMGI can serve to identify the virtual channel. More particularly, a TMGI includes three fields: a MNC=Mobile Network Code (carrier id); a MCC=Mobile Country Code (country id), and a MBMS Service ID (24 bits), wherein the MBMS Service ID identifies the virtual channel. In one illustrative implementation, a set of MBMS Service IDs are defined via network management and are mapped to virtual channels; and the mappings are loaded into the UE. Moreover, a VC identifier having a smaller number of bits than the MBMS Service ID can be included in the RRCConnectionRequest message 412; and that VC identifier is translated to the corresponding MBMS Service ID, which identifies the virtual channel.

In one embodiment, the UE 406 includes the UE identifier and the virtual channel identifier in an existing field of the RRCConnectionRequest message 412, such as in an S-TMSI field. FIG. 3 illustrates an S-TMSI field 300 formatted to include a UE identifier and a virtual channel identifier in accordance with the present disclosure. The S-TMSI field 300 includes an 8-bit MMEC (MME Code) field 302 and an adjacent 32-bit M-TMSI field. When the UE 406 first attaches to the eNodeB, the eNodeB selects a serving MME for the UE, and the MMEC is the unique identifier for the selected MME. Upon the UE reconnecting to the LTE (after being in an IDLE state), the eNodeB uses the MMEC to route signaling to the proper MME. The MME allocates the M-TMSI to the UE, wherein the M-TMSI has a structure or format that allows the UE 406 to include the VC identifier in the M-TMSI for enabling methods according to the present disclosure.

In this illustrative implementation, the M-TMSI includes a 3-bit FORMAT ID field 304, a 1-bit PRI field 306, a 6 to 8-bit VC field 308, a 5 to 14-bit reserved field 310, and a 0-17 bit UE ID/Signature field 312. When the MME generates the M-TMSI, only the UE ID field is populated, while the other bits are set to 0. When bits of value other than 0 are received in the FORMAT ID field, the fields other than just the UE ID are interpreted as meaningful. The PRI field 306 indicates whether the user of the UE is a regular user or is a priority user. The VC field 308 contains the virtual channel identifier. In this example the VC field has a length of only 6-8 bits, but it can be easily extended by appropriating bits from the adjacent RESERVED field.

Field 310 is reserved for future use, and may be used for example, for accommodating more UE or for defining new formats. Field 312 contains, depending on the FORMAT ID, the UE identifier and/or an encrypted signature (e.g., a digital certificate generated using a Public Key Infrastructure (PKI) infrastructure) for early validation of the requestor for the LTE connection. It should be noted that FIG. 3 provides one example of how the UE and VC identifiers can be included in existing messaging between the UE and the LTE system. However, alternative ways of incorporating these identifiers into existing messaging or the use of proprietary messaging that includes the VC and/or UE identifier is contemplated within the scope of the present disclosure.

Returning to method 200 of FIG. 2, upon receiving the request for an LTE connection and responsive to the contents in the request, the LTE system (either the eNodeB or the MME or the two cooperatively) generates (204), on behalf of the UE, a request to transmit media on the virtual channel and sends (206) the request to transmit to an application server. Stated another way, the UE sending the request for an LTE connection with the UE and VC identifiers triggers the LTE system to generate and send to the application server, on behalf of the UE, the request to transmit on the identified VC. Since the LTE system (and not the UE as is normally done) generates the request to transmit, it is deemed herein as a "proxied" request to transmit. The sending of this proxied request to transmit to the application server triggers the establishment of a call to deliver a media transmission from the UE (that sent the request for an LTE connection) to one or more other UE associated with the identified virtual channel. Details of the proxied request to transmit and the accompanying establishment of a call are discussed by reference to FIG. 4.

Accordingly, the MSC 400 shows the LTE subsystem sending a proxied request to transmit 414 to the application server 410. In one embodiment, upon receiving the RRCConnection message, the eNodeB retrieves the UE and VC identifiers from the M-TMSI and then generates and sends the request to transmit to the application server 410. In an alternative embodiment, when the eNodeB receives the request for the LTE connection, the eNodeB sends a message to the MME, which includes at least the VC identifier, to trigger the MME to create and send the proxied request to transmit to the application server. In one illustrative implementation, the message from the eNodeB to the MME contains the M-TMSI from the RRCConnection message and is, for example, a NAS Service Request message containing the M-TMSI or at least the VC identifier from the M-TMSI; or the message sent from the eNodeB to the MME can be a proprietary message containing the VC identifier.

Moreover, the request to transmit can be a message that is compatible with a standard or is a proprietary message that contains the UE and VC identifiers and an identifier for the serving eNodeB. For example, the request to transmit is a floor control request having a format consistent with the floor control request described in the Open Mobile Alliance Technical Specification for Push-to-talk over Cellular (OMA-TS-PoC) User Plane, which defines Media Burst Floor Control (MBCP) in version 1.0 and Talk Burst Floor Control (TBCP) in versions 2.0 and 2.1. Related messaging in accordance with this standard include a floor grant message that notifies the requesting UE that the floor control request was granted, and a floor taken message that notifies other UE associated with the virtual channel that a request to transmit was granted for a media transmission on the virtual channel.

The sending of the proxied request to transmit, by either the eNodeB or the MME, triggers the establishment of a call to deliver a media transmission from the UE 406 to the UE 402 and 404 over the virtual channel. As the term is used herein, a call is defined as the set of allocated of resources bounded by a floor grant at the start and floor idle at the end. Establishment of the call refers to the signaling sent to the UE (contemporaneously with or subsequent to the LTE subsystem sending the request to transmit), which prepares the virtual channel for an upcoming media transmission and/or notifies the UE that a media transmission is upcoming on the identified virtual channel so that the UE are prepared to receive and decode the transmission. Thus, the request to transmit triggering the establishment of a call, in one implementation, comprises at least triggering a notification to the UE 402 and 404 of the upcoming media transmission on the identified virtual channel, and a benefit is that this notification is sent out earlier than in standard LTE procedures.

Normally (in accordance with standard LTE), the notification of the start of a new comparable MBMS transmission is triggered by the BM-SC and has to be sent at least some 5-10 seconds prior to the actual start of the data transmission itself. In accordance with embodiments of the present disclosure, the notification of the start of a new MBMS transmission is triggered by the UE with data to send, which replaces the standard MBMS notification triggered by BM-SC. The procedure can be seen as having an uplink setup phase and a downlink setup phase, which ultimately result in the notification of the start of transmission being sent to the UE as well as the transmission itself. In general, the following steps take place in sequence, in accordance with standard LTE: a first UE sends the request for the LTE connection; a non-GBR floor control bearer is established; the first UE generates and sends a request to transmit (e.g., a floor control request) over the non-GBR floor control bearer to the application server; the application server sends a floor grant message to the first UE notifying the first UE that the floor control request was granted; and the application server sends a floor taken message. Then the application server triggers the notification for the start of the transmission. However, in accordance with the present disclosure, there is an earlier triggering of the notification of upcoming transmission to the UE that occurs responsive to the sending of the proxied request to transmit, which may result in latency of notification of the order of up to only a few hundred milliseconds.

In one embodiment, the eNodeB initiates the notification of upcoming media transmission. For example, upon receiving the RRCConnectionRequest message from the requesting UE, the eNodeB generates and routes a notification message (for example, via ports at the MBMS GW associated with the eNodeB and the identified virtual channel) to a set of eNodeBs participating in a MBSFN that supports the virtual channel. This results in a notification 420 sent over the air to the UE that use the virtual channel.

In an alternative embodiment, upon receiving the request to transmit 414, the application server sends the notification of upcoming media transmission to the UE that use the virtual channel. Accordingly, MSC 400 shows the application server 410 sending a notification of upcoming transmission 418 (e.g., the analogous of a paging request described in 3GPP TSs) that is communicated by the LTE system to the UE 402, 404, 406 as messaging 420. It is possible that the identity of the virtual channel carried by the request to transmit message 414 may be understood only within a restrictive setting, for example, only by the originating UE 406. To notify the other UE, a more general virtual channel identifier may be necessary. To this aim, the application server 410 further translates 416 the received virtual channel identifier into a different virtual channel identifier that is recognizable or known to subsystems on the PLMN and to UE other than UE 406.

Furthermore, in one implementation, the notification of the upcoming transmission 418 is sent to the UE 402, 404, 406 while the UE 406 is performing the RRC connection procedure and activating a dedicated EPS bearer for the media transmission. Activating the bearer, which is part of messaging 430, can involve a first case of the UE establishing a bearer in the LTE system when the UE has no allocated bearer or a second case of the UE reactivating an already allocated bearer that has gone inactive.

In a further embodiment (also illustrated by reference to method 200 of FIG. 2) to prevent the case of the application server starting the call when no dedicated EPS bearer can be established for the media transmission, the LTE subsystem notifies (208) the application server of the availability of the active bearer at the UE. To notify the application server, the LTE subsystem: determines that the dedicated bearer for the media transmission is already active or that it has been activated, creates a notification and sends it to the application server. Either the eNodeB or the MME can generate the notification to the application server that the dedicated EPS bearer was established for the upcoming media transmission on the virtual channel. Conversely, if the bearer is inactive even after trying to activate it, the application server is still notified so that it can deny the floor grant to the requestor UE.

Turning back to the illustrative implementation shown in FIG. 4, MSC 400 illustrates the application server 410 receiving a "bearer activated" or "bearer established" message 422 from the LTE subsystem 408 indicating that the dedicated EPS bearer was established for the media transmission on the identified virtual channel. This bearer activated message can take any suitable format including a modified message that is compatible with the LTE standard or a proprietary message.

In one implementation, receipt of the bearer activated message 422 triggers the application server 410 to signal to the UE 406 that the request to transmit was granted, e.g., via a floor grant message 424 sent on the UE's established EPS bearer. The application server, in this implementation, further signals 426, 428 to the UE 402 and 404, e.g., via a floor taken message sent on the downlink MBMS bearer, that a request to transmit was granted for a media transmission on the identified virtual channel and that a media transmission on the virtual channel may have started. It should be further noted that application server can send the floor grant and floor taken messages without first receiving the bearer activated message. In addition, it is optional whether the floor grant message is used as a gating message for the UE 406 to send voice.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for reducing set-up time for communications among multiple user equipment in a LTE communication system described herein. The non-processor circuits may include, but are not limited to, a radio receiver, a radio transmitter, signal drivers, clock circuits, power source circuits, and user input devices. As such, these functions may be interpreted as steps of a method for reducing set-up time for communications among multiple user equipment in a LTE communication system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for reducing set-up time for communications among multiple user equipment (UE) in a Long Term Evolution (LTE) system, the method comprising:
   receiving, by an LTE subsystem, a request for an LTE connection from a first UE, wherein the request comprises an identifier of a virtual channel associated with the first UE;
   responsive to contents in the request for the LTE connection, generating, by the LTE subsystem, on behalf of the first UE, a request to transmit media on the virtual channel, wherein the request to transmit comprises the identifier of the virtual channel included in the request received from the first UE; and
   sending, by the LTE subsystem, the request to transmit to an application server to trigger an establishment of a call to deliver a media transmission, from the first UE, to at least one other UE associated with the virtual channel.

2. The method of claim 1, wherein triggering the establishment of the call comprises at least triggering a notification, to the at least one other UE, of an upcoming media transmission on the virtual channel.

3. The method of claim 2, wherein the notification of the upcoming media transmission is sent to the at least one other UE while the first UE is activating a dedicated Evolved Packet System bearer for the media transmission.

4. The method of claim 1 further comprising the LTE subsystem notifying the application server when a dedicated Evolved Packet System bearer for the media transmission has been activated for the first UE.

5. The method of claim 4, wherein notifying the application server comprises the LTE subsystem performing:
   determining that the dedicated Evolved Packet System (kEPS) bearer for the media transmission has been activated;
   creating a notification confirming that the EPS bearer has been established;
   sending the notification to the application server.

6. The method of claim 4, wherein the LTE subsystem notifying the application server comprises an eNodeB notifying the application server.

7. The method of claim 4, wherein the LTE subsystem notifying the application server comprises a Mobility Management Entity notifying the application server.

8. The method of claim 1, wherein the request for the LTE connection comprises an RRCConnectionRequest message having contents that identify the virtual channel.

9. The method of claim 8, wherein the contents comprise an S-TMSI field that contains an identifier for the first UE and an identifier for the virtual channel.

10. The method of claim 8, wherein the RRCConnectionRequest message is received by an eNodeB, in the LTE subsystem, which generates and sends the request to transmit to the application server.

11. The method of claim 1, wherein the request for the LTE connection results in a message from an eNodeB to a Mobility Management Entity (MME), in the LTE subsystem, wherein the message from the eNodeB includes an identifier for the first UE and an identifier for the virtual channel, wherein the message from the eNodeB triggers the MME to generate and send the request to transmit to the application server.

12. A method for reducing set-up time for communications among multiple user equipment (UE) in a Long Term Evolution (LTE) system, the method comprising:
  receiving, by an application server, a request to transmit media on a virtual channel, wherein the request to transmit is generated by an LTE subsystem on behalf of a first UE associated with the virtual channel and wherein the request comprises an identifier of the virtual channel; and
  responsive to receiving the request to transmit, sending, by the application server to at least one other UE associated with the virtual channel, a notification of upcoming media transmission on the virtual channel.

13. The method of claim 12, wherein the request to transmit includes a first virtual channel identifier, the method further comprising the application server translating the first virtual channel identifier into a second virtual channel identifier known to subsystems and UE other than the first UE.

14. The method of claim 12 further comprising the application server receiving a bearer activated message when a dedicated Evolved Packet System bearer has been activated for the first UE for the media transmission.

15. The method of claim 14 further comprising, in response to the bearer activated message, signaling the first UE that the request to transmit is granted.

16. The method of claim 15 further comprising, in response to the bearer activated message, signaling the at least one other UE that a request to transmit was granted for the media transmission.

17. A method for reducing set-up time for communications among multiple user equipment (UE) in a Long Term Evolution (LTE) system, the method comprising:
  generating, by a UE, a request for an LTE connection, wherein the request includes an identifier for the UE and an identifier for a virtual channel with which the UE is associated;
  sending, by the UE, the request to an LTE subsystem to trigger the LTE subsystem to generate, and send to an application server on behalf of the UE, a request to transmit media on the virtual channel.

18. The method of claim 17, wherein the identifier for the UE and the identifier for the virtual channel are included in an S-TMSI field.

* * * * *